(12) United States Patent
Miller

(10) Patent No.: US 6,332,308 B1
(45) Date of Patent: Dec. 25, 2001

(54) AIR FILTRATION DEVICE FOR USE WITH ROOF DRILL

(76) Inventor: Rodney Miller, 2662 Left Fork of Long Fork, Virgie, KY (US) 41572

( * ) Notice: Subject to any disclaimer, the term of this patent is extended or adjusted under 35 U.S.C. 154(b) by 0 days.

(21) Appl. No.: 09/532,161

(22) Filed: Mar. 21, 2000

Related U.S. Application Data

(60) Provisional application No. 60/137,480, filed on Jun. 4, 1999.

(51) Int. Cl.$^7$ .................................................. B01D 50/00
(52) U.S. Cl. ........................... 055/385.5; 55/356; 55/485; 55/DIG. 18; 55/96; 55/380
(58) Field of Search .................................. 55/356, 385.1, 55/385.2, 385.5, 471, 485, 486, 487, DIG. 18, DIG. 46, DIG. 3; 96/380; 454/67, 187; 126/299 D

(56) References Cited

U.S. PATENT DOCUMENTS

| | | |
|---|---|---|
| 1,057,568 | 4/1913 | Mayer et al. . |
| 1,578,814 | 3/1926 | D'Ascenzo . |
| 1,972,846 | 9/1934 | Kelley . |
| 2,590,958 | 4/1952 | Goodrich . |
| 2,829,867 | 4/1958 | Brochetti . |
| 2,829,908 | 4/1958 | Brochetti et al. . |
| 2,832,567 | 4/1958 | Fletcher et al. . |
| 3,462,919 | 8/1969 | Zalman . |
| 3,870,489 * | 3/1975 | Shaddock ................................ 55/356 |
| 3,924,696 | 12/1975 | Horlin et al. . |
| 3,955,236 * | 5/1976 | Mekelburg ........................ 55/DIG. 3 |
| 4,081,041 | 3/1978 | Perri et al. . |
| 4,099,937 | 7/1978 | Ufken et al. . |
| 4,205,728 | 6/1980 | Gloor et al. . |
| 4,444,280 | 4/1984 | Howeth . |
| 4,512,245 * | 4/1985 | Goldman ................................ 55/356 |
| 4,574,420 * | 3/1986 | Durpre .................................... 55/356 |
| 4,701,193 * | 10/1987 | Robertson et al. ..................... 96/380 |
| 4,921,375 | 5/1990 | Famulari . |
| 5,090,499 | 2/1992 | Cuneo . |
| 5,142,732 * | 9/1992 | Davis ..................................... 55/356 |
| 5,230,723 * | 7/1993 | Travis et al. ........................... 55/356 |
| 5,593,470 * | 1/1997 | Shagott et al. ......................... 55/356 |
| 5,605,421 | 2/1997 | Hodgson . |
| 5,702,493 * | 12/1997 | Everetts et al. ........................ 55/356 |
| 5,785,723 * | 7/1998 | Beran et al. ........................... 55/356 |
| 5,788,565 * | 8/1998 | Chang ............................. 126/299 D |
| 5,873,919 * | 2/1999 | Vross et al. ............................ 55/356 |
| 6,022,389 * | 2/2000 | Vross et al. ............................ 55/356 |
| 6,178,592 * | 1/2001 | Whitney ................................. 55/356 |

FOREIGN PATENT DOCUMENTS 266630   3/1927   (GB) .

\* cited by examiner

*Primary Examiner*—David A. Simmons
*Assistant Examiner*—Minh-Chan T. Pham
(74) *Attorney, Agent, or Firm*—Richard C. Litman

(57) ABSTRACT

The air filtration device for use with a roof drill has an air intake block attached to a vertical support abutting the mine roof lateral to the drill hole. A flexible hose attached to a dust filter and a vacuum source for filtering and collecting dust from the air before exhausting the air to the atmosphere is connected to the air intake block. The air intake block has a plurality of holes defined in at least one face of the block for the intake of dust laden air and an air passage within the block in communication with the vacuum source provided by the flexible hose. The holes defined in the air intake block may be covered by screens to prevent the entrance of large particles into the air intake block. The air intake block is disposed to provide sufficient suction lateral to the longitudinal axis of the drill steel in order to remove fine particles of quartz and dust from the air adjacent the entrance of the drill hole.

14 Claims, 3 Drawing Sheets

AIR FILTRATION DEVICE FOR USE WITH ROOF DRILL

CROSS-REFERENCE TO RELATED APPLICATION

This application claims the benefit of U.S. Provisional Patent Application Serial No. 60/137,480, filed Jun. 4, 1999.

BACKGROUND OF THE INVENTION

1. Field of the Invention

The present invention relates to safety devices for miners, and particularly to a dust collection and air filtration device for use with a roof drill, also known as a roof bolter, used in the mining industry.

2. DESCRIPTION OF RELATED ART

It has been found that the rock in a mine roof may be adequately supported by bolts placed in the roof instead of posts or columns. The procedure used in placing bolts in the mine roof involves drilling a hole for the bolt in the roof with a device known as a mine drill. The drill is mobile, usually being mounted on a truck, and has a hydraulically operated roof support, often counterbalanced by a floor support so that the roof support is not borne by the truck during drilling operations. The truck bears at least one drill, and frequently two drills, including a chuck, a motor (either electric or hydraulic), a drill steel, and a rock cutting drill bit, collectively referred to as a "drill pot" in this application. After the hole is drilled in the roof, an expansion bolt is placed in the hole with a resin, wedging the rock in the roof.

A problem which arises during the drilling operation is that a great deal of dust and rock cuttings are generated as the drill bores into the mine roof. The dust poses a hazard, both generating the potential for explosion, and also as a health hazard to mine workers. Consequently, roof drills are generally equipped with some sort of apparatus for collecting the dust. Since the roof drill is often operated in a long tunnel or cavern, the air supply is limited, and therefore the dust collector also includes a filtration device in order to remove the dust from the air and to recirculate the air.

U.S. Pat. No. 2,590,958, issued Apr. 1, 1952 to R. H. Goodrich, describes a dust collector for a stoper type pneumatic roof drill. The device has two semicylindrical portions which are hinged together to form a cone shaped funnel about the drill steel. A side discharge tube is connected to the funnel, the discharge tube having a nozzle casing defining a venturi having a jet connected to a fluid source, which creates a vacuum which sucks the dust into the funnel and through the discharge tube.

U.S. Pat. Nos. 2,829,867 and 2,829,908, issued Apr. 8, 1958 to R. E. Brochetti and to Brochetti, et al. respectively, describe a dust collecting head for a roof drill and means for supporting the head. The dust collector includes a cylindrical housing with a sleeve through which the drill is inserted, and a discharge nozzle connected to a suction source entering the side of the housing and penetrating to the air gap between the sleeve and drill. The housing includes a conical, suction cup type disk adapted for attachment to the roof of the mine.

U.S. Pat. No. 2,832,567, issued Apr. 29, 1958 to Fletcher, et al., discloses a mobile roof drill. The roof drill includes a collar around the drill steel serving as a guide, with a funnel-like collector around the upper end of the collar and a side collector hose connected to a vacuum source.

U.S. Pat. No. 4,081,041, issued Mar. 28, 1978 to Perri, et al., teaches a dust collecting head for a roof drilling machine having two symmetrical halves of a funnel shaped member pivotally attached to arms which close around the drill rod to form a cup. Two conduits are attached to the narrow portion of the funnel tangentially and 180° apart, the conduits being attached to a vacuum source and creating a swirling effect to suction off the dust.

U.S. Pat. No. 4,099,937, issued Jul. 11, 1978 to Ufken, et al., shows a multi-stage filter for the dust collecting apparatus of a roof drill. The dust is collected from the drill hole by suction applied to a hollow drill rod surrounding the drill bit. The dust laden air is processed through dust collection chambers including a cyclone separator, a tubular separator, and a paper filter before being exhausted to the atmosphere.

Other dust collecting devices for rock drills are shown in U.S. Pat. No. 1,057,568, issued Apr. 1, 1913 to Mayer, et al. (tubular body clamped to the stem of the drill); U.S. Pat. No. 1,972,846, issued Sep. 4, 1934 to G. S. Kelley (deflector having the shape of the frustum of a cone mounted about drill steel, and a conduit attached to a sidewall of the deflector which is connected to a blower motor for withdrawing the dust); U.S. Pat. No. 3,924,696, issued Dec. 9, 1975 to Horlin, et al. (for a drill which injects air through the drill bit to blow the cuttings out of the hole, a shell mounted around the drill stem which injects air downward to slow the upward rush of air from the hole, and a side discharge tube connected to a vacuum); and United Kingdom Patent No. 266,630, published Mar. 3, 1927 (drill passing through a T-connector with rubber cups, the side arm being connected to a second T-connector).

Other dust collectors for drills generally include U.S. Pat. No. 4,205,728, issued Jun. 3, 1980 to Gloor, et al. (suction attachment around drill bit with side discharge tube having a nozzle creating venturi effect); U.S. Pat. No. 4,444,280, issued Apr. 24, 1984 to D. F. Howeth (for a drill which drills into the ground, a collector including a duct angling upward and having two rigid sections connected by a flexible hose); U.S. Pat. No. 4, 921,375, issued May 1, 1990 to G. Famulari (a bell shaped bellows attached to a drill coaxial with the bit); U.S. Pat. No. 5,090,499, issued Feb. 25, 1992 to G. L. Cuneo (for a portable hand drill, a suction head with a drill bit extending transversely through the suction head); and U.S. Pat. No. 5,605,421, issued Feb. 25, 1997 to P. Hodgson (drill bit extending through dust extractor attached to vacuum cleaner).

A device for removing gas and dust from mines is shown in U.S. Pat. No. 1,578,814, issued Mar. 30, 1926 to A. D's Ascenzo, the device including a motor on a truck driving two fans, one of the fans having a flexible hose directed towards the roof of the mine for withdrawing gas to a compressor and flask where it is sealed by a valve for disposal, and the other fan being connected to a flexible hose directed to the floor of a mine for collecting dust which is collected in a bag for disposal.

It will be observed that prior dust collecting devices for roof drills employ either a vacuum applied to a hollow drill bit for suctioning cuttings from the drill hole, or a cup or funnel shaped collector with a vacuum for suctioning the dust vertically downward from the drill hole parallel to the sides of the drill steel. Such devices are generally effective for withdrawing relatively large cuttings having significant mass. However, there are still problems associated with collecting finer dust particles generated by roof drills.

With several of these devices, the collection head cannot be maintained in constant contact with the roof of the mine. The air currents surrounding the entrance of the drill hole are complex, and finer particles may be forced laterally before entering the vacuum zone of the collecting head. Hence, miners may still be required to wear rebreathing apparatus to avoid collecting fine particles of quartz or coal dust in their lungs, which may result in silicosis, pneumoconiosis and other respiratory diseases.

The air filtration device for use with a roof drill solves this problem by providing a dust collection head attached to a vacuum source, the dust collection head being fixedly positioned at the roof of the mine lateral to the entrance of the drill hole. The device is used in conjunction with a dust collection device vertically below the drill hole so that dust is removed from the air adjacent the drill hole.

None of the above inventions and patents, taken either singly or in combination, is seen to describe the instant invention as claimed.

SUMMARY OF THE INVENTION

The air filtration device for use with a roof drill has an air intake block attached to a vertical support abutting the mine roof lateral to the drill hole. A flexible hose attached to a dust filter and a vacuum source for filtering and collecting dust from the air before exhausting the air to the atmosphere is connected to the air intake block. The air intake block has a plurality of holes defined in at least one face of the block for the intake of dust laden air and an air passage within the block in communication with the vacuum source provided by the flexible hose. The holes defined in the air intake block may be covered by screens to prevent the entrance of large particles into the air intake block. The air intake block is disposed to provide sufficient suction lateral to the longitudinal axis of the drill steel in order to remove fine particles of quartz and dust from the air adjacent the entrance of the drill hole.

Accordingly, it is a principal object of the invention to provide an air filtration device for use with a roof drill.

It is another object of the invention to provide an air filtration device which applies lateral suction at the mouth of a drill hole bored by a roof drill.

It is a further object of the invention to provide an air filtration device for use with a roof drill which maintains an air intake block providing suction for collecting dust laden air from the mouth of the drill hole in fixed position throughout the drilling operation.

Still another object of the invention is to provide an air filtration device for use with a roof drill adapted for removing fine particles of quartz and coal dust from the air immediately surrounding the drill hole.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
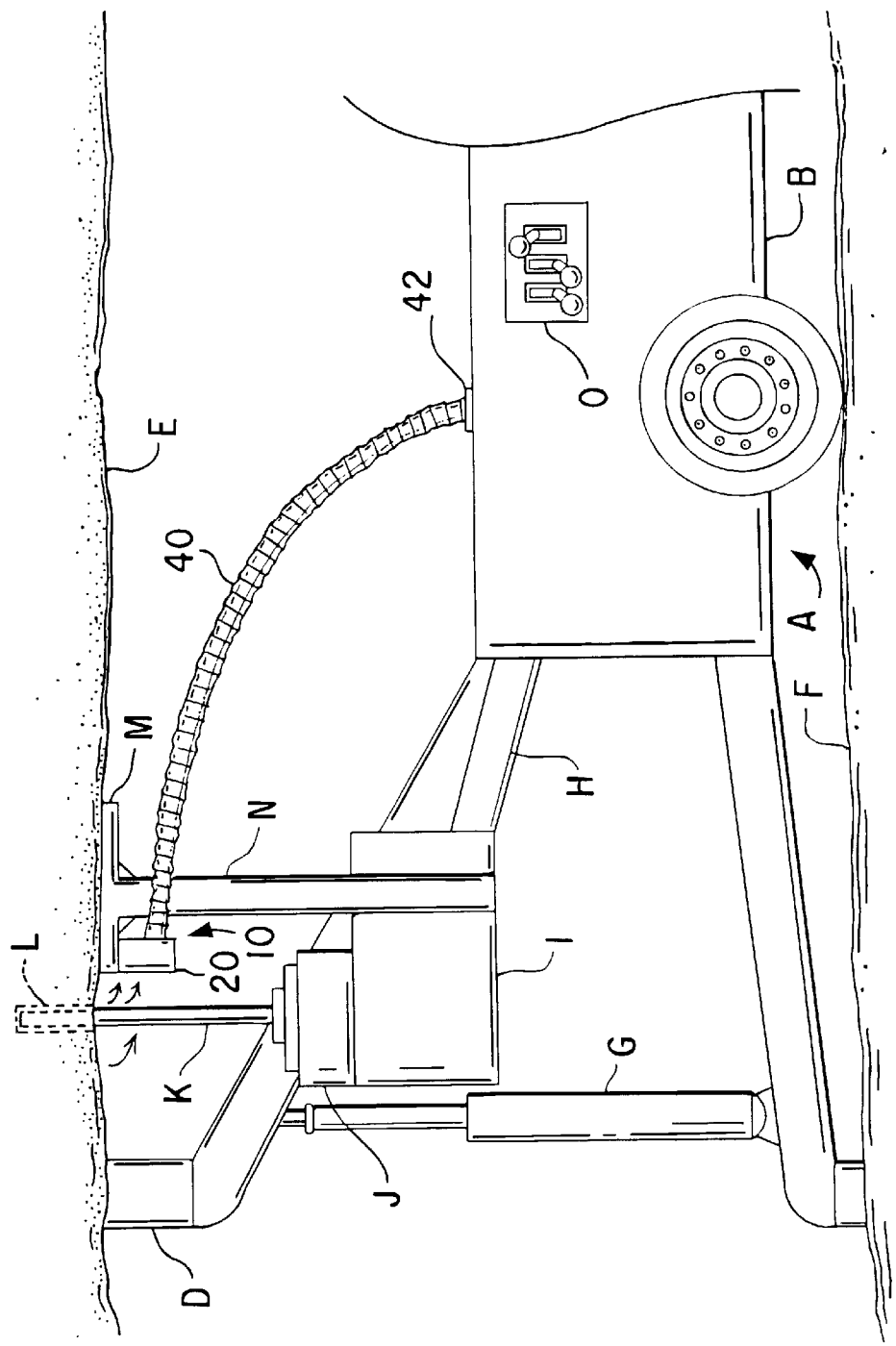
FIG. 1 is a diagrammatic, environmental, side view of an air filtration device for use with roof drill according to the present invention.

The present invention is an air filtration device, designated generally as 10 in the drawings, for use with a roof drill. For purposes of illustration, the air filtration device 10 is shown with a dual head roof drill, illustrated diagrammatically, such as the dual head drills made by J. H. Fletcher & Co. It will be understood, however, that the air filtration device 10 may be used with other makes and models of roof drills, whether dual head or single head, with appropriate modification.

The roof drill A is mounted on a mobile carriage or cart B which may be driven into the mine entrance by a truck C or other heavy equipment vehicle. The roof drill A shown has a T-bar D pivotally mounted on the cart B which supports the roof E of the mine during drilling operations, the T-bar D being braced against the floor F of the mine by an extensible hydraulic cylinder and piston G arrangement. The cart B supports a pair of pivotally mounted booms H. A drill head I is mounted at the end of each boom H, the drill head I being slidably moveable in a vertical direction. A drill pot J (including a motor and chuck) is mounted on the drill head I. A drill steel K and bit are mounted on the drill pot J for drilling a bolt hole L in the mine roof E. A canopy or shield M mounted on a vertical support post N is also mounted on the drill head I. The canopy M is maintained in abutting relation with the mine roof E during drilling operations in order to prevent loose rocks and dust from damaging the roof drill A. The front edge of the canopy M is offset from the drill hole L so that it does not obstruct the drill pot J during drilling of the hole L. A control panel O with switches and levers for operating the roof drill A may be mounted on the cart B.

It will be understood that the roof drill A may include a dust collector (not shown), which may be of the type including a hollow drill bit with suction applied to the bit to remove cuttings from the drill hole L, or which may be of the cup or funnel type which is mounted about the drill steel K.

The air filtration device 10 for a roof drill includes an air intake block 20 mounted on a vertical support as close to the drill hole L as may be practicable without interfering with operation of the drill pot J or head I. In the example shown in FIGS. 1 and 2, the air intake block 20 is conveniently mounted on the leading edge of the canopy M, as the canopy M is maintained in abutting relation with the mine roof E during drilling operations and extends as close to the drill hole L as possible without interfering with the drill pot J. On roof drills not equipped with a canopy M, the air intake block may be mounted on any other conveniently available vertical support adjacent the drill hole L, or the roof drill A may be modified to include a vertical support.

Figure 3:
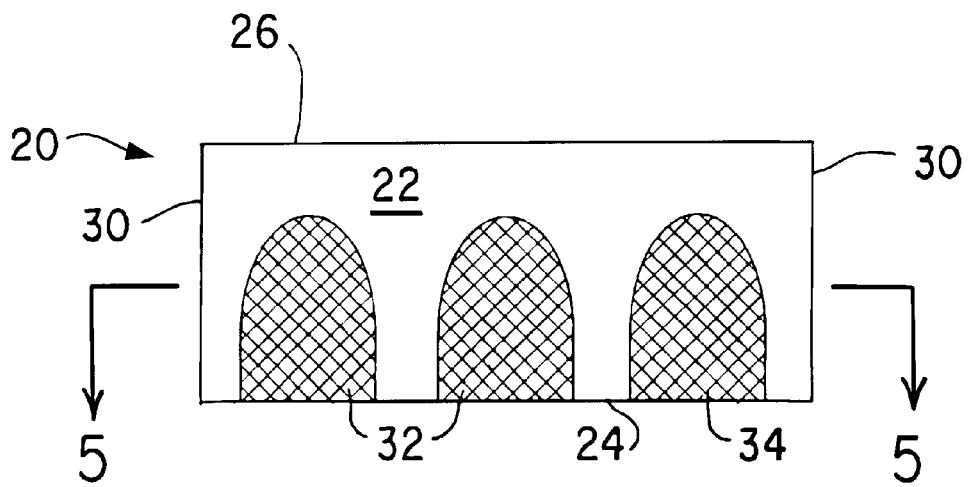
FIG. 3 is a front view of an air intake block of the filtration device according to the present invention.
Figure 4:
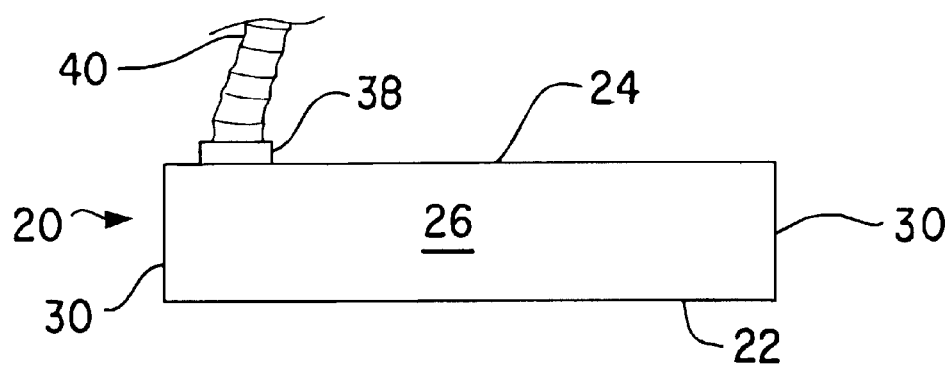
FIG. 4 is a plan view of an air intake block of the filtration device according to the present invention.
Figure 5:
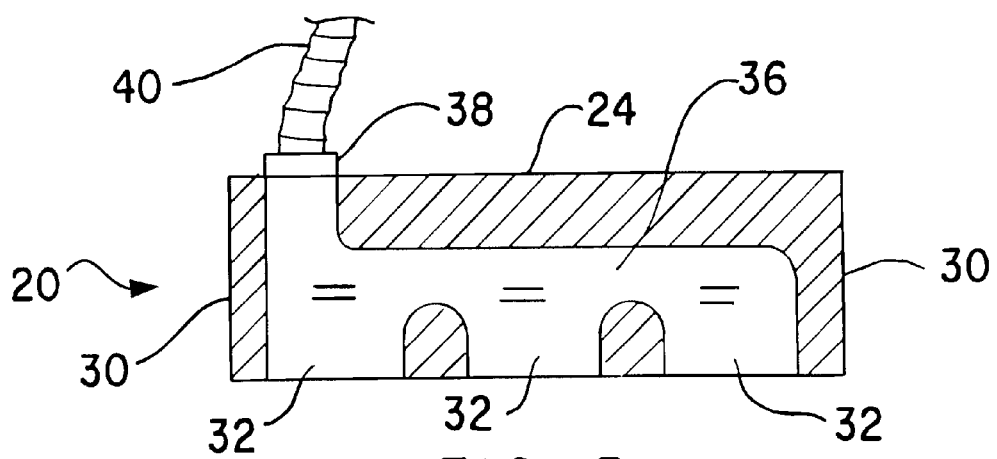
FIG. 5 is a section view along the line 5—5 of FIG. 3.

The air intake block 20 is shown more particularly in FIGS. 3, 4, and 5. In the embodiment shown, the air intake block 20 has the shape of a rectangular box having a front face or wall 22, a rear wall 24, a top wall 26, a bottom wall 28, and two opposing side walls 30. In a preferred embodiment, the dimensions of the air intake block are about 3" high, 6½" wide and 1¼" thick. It will be understood that the shape and dimensions of the air intake block 20 may vary, and are dependent upon the configuration of the particular roof drill A to which it is attached.

The air intake block 20 has a plurality of holes 32 defined in at least one face of the block 20, preferably the front face 22, as shown in FIG. 3. The holes 32 may be covered by a mesh screen 34 so that particles greater than a predetermined size may not enter the block 20. The holes 32 communicate with a common air passage or manifold 36 defined in the block 20. The rear wall 24 has an exit port 38 defined therein. One end of a flexible hose 40 is connected to the exit port 38.

Figure 2:
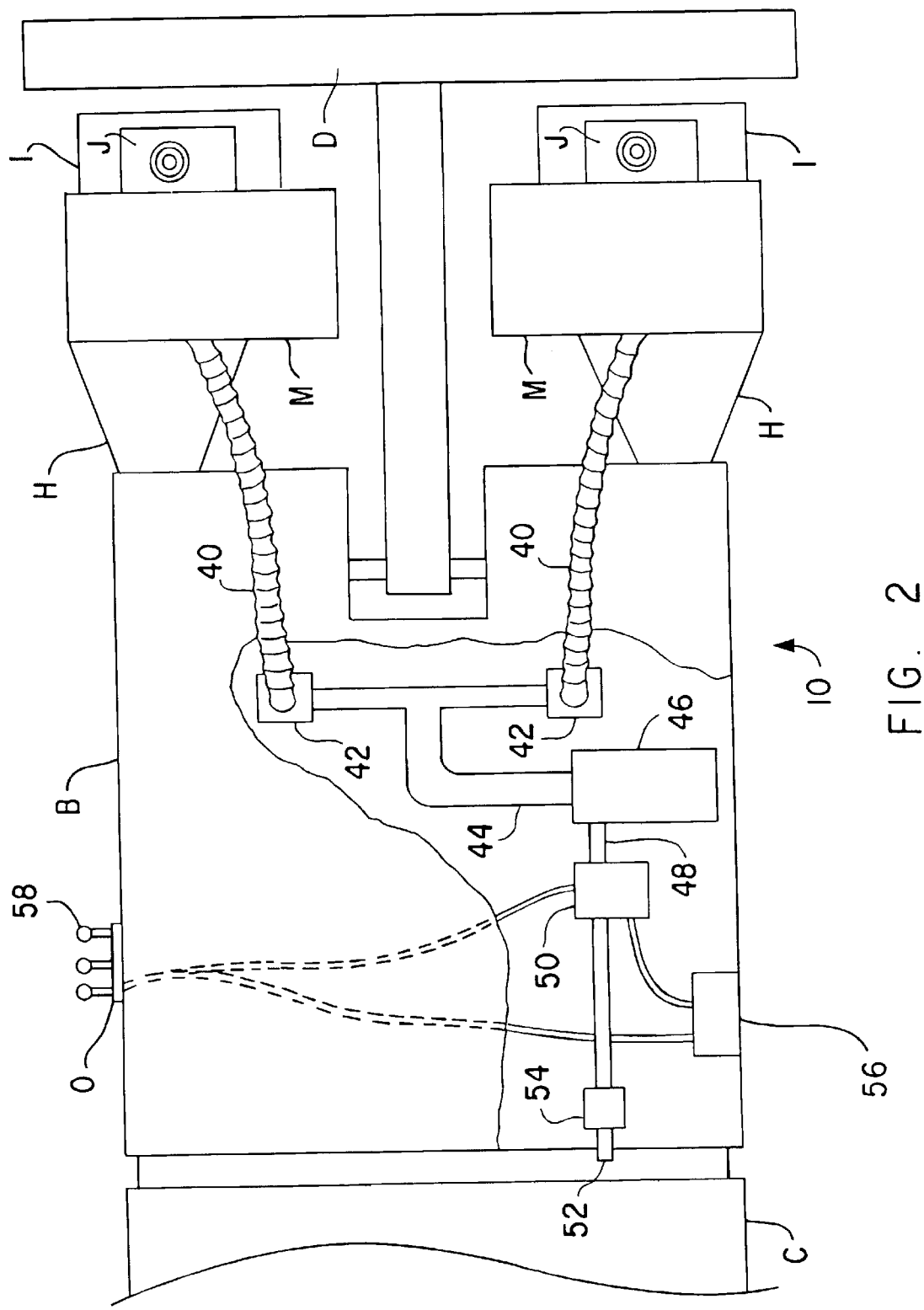
FIG. 2 is a diagrammatic, plan view of a roof drill equipped with an air filtration device according to the present invention with the top of the roof drill housing broken away.

As shown in FIG. 2, the opposite end of the flexible hose 40 is connected to an intake port 42 on the cart B. It will be understood that a dual head roof drill A will have a pair of air intake blocks 20, one block 20 being mounted on the canopy M adjacent each drill pot J, respectively. The hoses 40 from each block may be joined to a common air duct 44 connected to a dust filter and collection box 46 of a type conventional in the art for filtering dust from the air for disposal. An air passage 48 connects the filter 46 with a blower motor 50. The blower motor 50 provides sufficient vacuum to draw air from the vicinity of the drill hole L, through the holes 32 in the front face 22 of the air intake block 20, as depicted by the arrows in FIG. 1, and then through the hoses 40 and the filter 46. The blower motor 50 exhausts the filtered air through an exhaust port 52, and optionally through a muffler 54, into the atmosphere.

The blower motor 50 is connected to the power supply panel 56. A lever 58 on the control panel O electrically connected to the blower motor 50 and the power supply panel 56 may be used by the operator of the roof drill A to apply vacuum to the air intake block 20 as required. It will be seen that the air filtration device 10 of the present invention, by being attached to a vertical support maintained in abutting relation with the roof E of the mine as closely adjacent to the mouth of the drill hole L as practicable throughout the drilling operation, and applying a vacuum lateral or transverse to the axis of the drill steel K through the holes 32 of the air intake block 20, effectively removes lighter weight quartz and dust particles from the air which might otherwise not be drawn within the zone of a vacuum applied vertically below the drill hole It is to be understood that the present invention is not limited to the sole embodiments described above, but encompasses any and all embodiments within the scope of the following claims.

I claim:

1. An air filtration device for collecting dust generated by a roof drill having a drill steel while drilling a bolt hole in a mine roof, the filtration device comprising:
   a) an air intake block mounted at a mine roof adjacent a drill steel drilling a bolt hole in a mine roof, the air intake block having the shape of a rectangular box including a front face, a rear wall, a top wall, a bottom wall, and a pair of opposing side walls, the front face having a plurality of holes defined therein, the air intake block having a common air passage defined therein, the plurality of holes being in communication with said common air passage, the air intake block having an exit port defined therein;
   b) a plurality of mesh screens covering the plurality of holes defined in the front face of said air intake block for limiting the size of dust particles entering said air intake block; and
   c) a vacuum source for applying a vacuum connected to said air intake block, said air intake block directing the vacuum transverse to a longitudinal axis through the drill steel to an area around the bolt hole for removing dust laden air.

2. The air filtration device according to claim 1, further comprising an air filter and dust collection box connected to said air intake block for removing dust from the air.

3. The air filtration device according to claim 2, further comprising a flexible hose connecting said air filter and dust collection box to said air intake block.

4. The air filtration device according to claim 2, further comprising an exhaust port connected to said vacuum source for exhausting filtered air to the atmosphere.

5. The air filtration device according to claim 1, further comprising a switch electrically connected to said vacuum source for turning said vacuum on and off.

6. The air filtration device according to claim 1, wherein said vacuum source is a blower motor.

7. The air filtration device according to claim 1, further comprising a vertical support post mounted on a roof drill in abutting contact with the roof of a mine, said air intake block being mounted on said vertical support post.

8. An air filtration device for collecting dust generated by a roof drill having a drill steel while drilling a bolt hole in a mine roof, the filtration device comprising:
   a) an air intake block mounted at a mine roof adjacent a drill steel drilling a bolt hole in a mine roof, the air intake block having the shape of a rectangular box having a front face, a rear wall, a top wall, a bottom wall, and a pair of opposing side walls, the front face having a plurality of holes defined therein for admitting dust laden air, said air intake block having a common air passage defined therein, the plurality of holes being in communication with said common air passage, the air intake block further having an exit port;
   b) a plurality of mesh screens covering the plurality of holes defined in the front face of said air intake block for limiting the size of dust particles entering said air intake block;
   c) an air filter and dust collection box connected to said air intake block by a flexible hose;
   d) a vacuum source for applying a vacuum connected to said air filter and dust collection box, said air intake block directing the vacuum transverse to a longitudinal axis through the drill steel to an area around the bolt hole for removing dust laden air; and
   e) a switch electrically connected to said vacuum source for turning said vacuum source on and off.

9. The air filtration device according to claim 8, further comprising a vertical support post mounted on a roof drill in abutting contact with the roof of a mine, said air intake block being mounted on said vertical support post.

10. The air filtration device according to claim 8, wherein said vacuum source is a blower motor.

11. The air filtration device according to claim 8, further comprising an exhaust port connected to said vacuum source for exhausting filtered air to the atmosphere. said common air passage.

12. The air filtration device according to claim 8, further comprising:
   a) an exhaust port connected to said vacuum source for exhausting filtered air to the atmosphere; and
   b) a muffler connected to said exhaust port for reducing the level of sound emitted when exhausting filtered air to the atmosphere.

13. An air filtration device for collecting dust generated by a roof drill while drilling a bolt hole in a mine roof in combination with a roof drill, comprising:

a) a roof drill for drilling a bolt hole in a mine roof, the roof drill having a drill steel;

b) an air intake block mounted at the mine roof adjacent the drill steel; and c) a vacuum source for applying a vacuum connected to said air intake block, said air intake block directing the vacuum transverse to a longitudinal axis through the drill steel to an area around the bolt hole for removing dust laden air.

14. The air filtration device according to claim 13, wherein said air intake block has the shape of a rectangular box having a front face, a rear wall, a top wall, a bottom wall, and a pair of opposing side walls, the front face having a plurality of holes defined therein, said air intake block having a common air passage defined therein, the plurality of holes being in communication with said common air passage, said air intake block further comprising:

a) an exit port defined in said air intake block; and b) a plurality of mesh screens covering the plurality of holes defined in the front face of said air intake block for limiting the size of dust particles entering said air intake block.

\* \* \* \* \*